(12) United States Patent
Kouno et al.

(10) Patent No.: US 9,450,509 B2
(45) Date of Patent: Sep. 20, 2016

(54) POWER CONVERSION APPARATUS

(71) Applicant: KABUSHIKI KAISHA TOSHIBA, Tokyo (JP)

(72) Inventors: Yuusuke Kouno, Tokyo (JP); Yosuke Nakazawa, Tokyo (JP); Kentaro Suzuki, Tokyo (JP); Ryuta Hasegawa, Tokyo (JP); Tomoyuki Makino, Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 424 days.

(21) Appl. No.: 14/162,400

(22) Filed: Jan. 23, 2014

(65) Prior Publication Data
US 2014/0203632 A1   Jul. 24, 2014

(30) Foreign Application Priority Data
Jan. 24, 2013   (JP) ................. 2013-011332

(51) Int. Cl.
| H02J 1/10 | (2006.01) |
| H02M 7/219 | (2006.01) |
| H02M 1/32 | (2007.01) |
| H02M 7/483 | (2007.01) |
| H02M 7/49 | (2007.01) |
| H02M 1/00 | (2006.01) |

(52) U.S. Cl.
CPC ............. H02M 7/219 (2013.01); H02M 1/32 (2013.01); H02M 7/483 (2013.01); H02M 7/49 (2013.01); *H02M 2001/007* (2013.01)

(58) Field of Classification Search
CPC ........ H02M 7/219; H02M 1/32; H02M 7/49; H02M 2001/007; H02M 7/483

USPC .......................................... 307/43
See application file for complete search history.

(56) References Cited

U.S. PATENT DOCUMENTS

2009/0102436 A1 * 4/2009 Escobar Valderrama ........ H02J 3/1857 323/207
2014/0003095 A1 * 1/2014 Thomas ............ H02M 3/33584 363/21.04

FOREIGN PATENT DOCUMENTS

JP    2004007941 A    1/2004
JP    2013198200 A    9/2013

OTHER PUBLICATIONS

Guillaume Gateau et al., Multicell Converters: Active Control and Observation of Flying-Capacitor Voltages, IEEE Transactions on Industrial Electronics, vol. 49, No. 5, Oct. 2002, pp. 998-1008, 2002.

* cited by examiner

*Primary Examiner* — Jared Fureman
*Assistant Examiner* — Duc M Pham
(74) *Attorney, Agent, or Firm* — Patterson & Sheridan, LLP

(57) ABSTRACT

A power conversion apparatus comprises a first converter connected to a second converter. The first converter includes a first capacitor and the second converter includes a second capacitor connected in series to a third capacitor. The capacitors are each connected in parallel with a respective resistor. The power conversion apparatus also includes a bypass switch connected in parallel to the first converter and in series to the second converter. A control module is configured to control a single-phase output voltage by operation of the first converter, the second converter, and the bypass switch.

15 Claims, 14 Drawing Sheets

POWER CONVERSION APPARATUS

CROSS-REFERENCE TO RELATED APPLICATION

This application is based upon and claims the benefit of priority from Japanese Patent Application No. 2013-011332, filed Jan. 24, 2013, the entire contents of which are incorporated herein by reference.

FIELD

Embodiments described herein relate generally to a power conversion apparatus.

BACKGROUND

Conventionally, it is often the case that a converter includes a diode clamp-type 3-level circuit. With respect to such a converter, there has been a demand for miniaturization of a converter device using a low loss device such as a silicon carbide element. However, so far as currently available silicon carbide elements are concerned, there is no known element which withstands a high voltage. Accordingly, it is necessary to arrange the silicon carbide elements in series or to adopt multi-leveling where the silicon carbide element is combined with an existing silicon element. Of these two methods, the arrangement of the elements in series has drawbacks such as an increase in resistance losses, an increase in the total number of components and the necessity for balance control. Accordingly, the multi-leveling is viewed as more practical than the arrangement of the elements in series.

With respect to the multi-leveling technique, a flying capacitor method has been proposed as a method where the number of switching elements can be decreased against the number of levels of an output voltage. However, the number of capacitors is increased in such a method.

A diode clamping method has been proposed for limiting the increase in the number of capacitors in a multi-leveling device. In the diode clamping method, a balance circuit having a filter capacitor voltage is necessary so that there is a possibility that the size of the converter device is increased. Besides the diode clamping method, other methods include a cascade method where AC (alternating current) input/output points of single-phase full-bridge converters (inverter) are connected in series and a gray scale control method.

In the related art, the number of capacitors can be decreased while ensuring a high electrical breakdown strength. However, the number of switching elements is increased with the number of levels of the output voltage and hence, the miniaturization of a converter device is difficult.

Accordingly, the use of a multi-level converter where a plurality of different level converters are connected in series is considered. However, a circuit which suppresses an overvoltage of a capacitor of the level converter becomes necessary for each level converter. Although a protective circuit for suppressing the overvoltage includes a discharge resistor for performing a rapid discharge, the protective circuit is required to have a capacity which can withstand a large electric current so there is a tendency that the protective circuit becomes larger. Accordingly, it is difficult to reduce the size of the power conversion apparatus.

DETAILED DESCRIPTION

Figure 1:
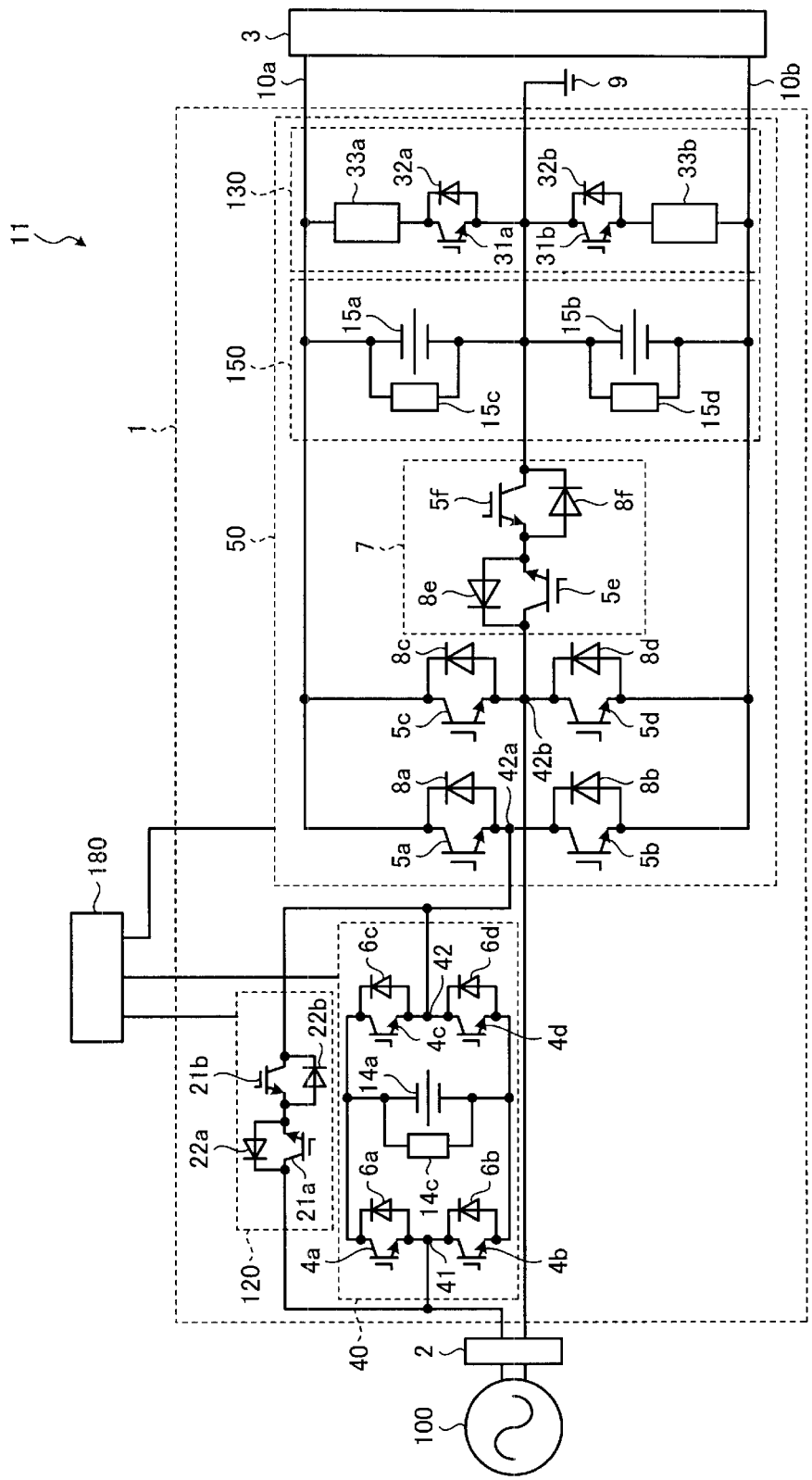
FIG. 1 depicts a multi-level converter of a power conversion apparatus according to a first embodiment.

According to the present disclosure, there is provided a power conversion apparatus which can provide appropriate control while having a fewer number of parts.

In general, according to an embodiment, a power conversion apparatus comprises a first converter connected to a second converter. The first converter includes a first capacitor and the second converter includes a second capacitor connected in series to a third capacitor. The capacitors are each connected in parallel with a respective resistor. The power conversion apparatus also includes a bypass switch connected in parallel to the first converter and in series to the second converter. A control module is configured to control a single-phase output voltage by operation of the first converter, the second converter, and the bypass switch.

In general, according to another embodiment, a power conversion apparatus for a vehicle is a power conversion apparatus for converting single phase AC power to DC power. The power conversion apparatus includes a single-phase 2-level converter, a single-phase 3-level converter, and a bidirectional bypass switch. The single-phase 2-level converter includes a capacitor. In the single-phase 2-level converter, a first switching device and a second switching device which have a self arc-extinguishing ability and are arranged in parallel to the capacitor are connected as two elements in series via a first connection point connected to a power source which supplies the single phase AC power, a third switching device and a fourth switching device which are arranged in parallel to the capacitor are connected as two elements in series via a second connection point, and a diode is connected in reverse parallel with the switching device for every switching device. The single-phase 3-level converter includes two capacitors connected in series. In the single-phase 3-level converter, a fifth switching device and a sixth switching device which are arranged in parallel to the series-connected capacitors are connected as two elements in series via a third connection point connected to the second connection point, a seventh switching device and an eighth switching device which are arranged in parallel to the capacitors connected as two elements in series are connected as two elements in series via a fourth connection point, a bidirectional switch where a ninth switching device and a tenth switching device are connected in series with opposite polarities is provided on a path from the fourth connection point to a neutral point, and a diode is connected in reverse parallel with the switching device for every switching device. In the bidirectional bypass switch, an eleventh switching device and a twelfth switching device which are connected as two elements in series are arranged in parallel to the single-phase 2-level converter, and a diode arranged in reverse parallel to the eleventh switching device and a diode arranged in reverse parallel to the twelfth switching device are connected to each other with opposite polarities.

First Embodiment

FIG. 1 depicts a multi-level converter of a power conversion apparatus 11. Power conversion apparatus 11 can be mounted in, for example, a vehicle, such as an automobile. As shown in FIG. 1, the multi-level converter 1 according to this first embodiment is configured such that a single-phase 3-level converter 50 and a single-phase 2-level converter 40 are connected in series.

The multi-level converter 1 is connected to an AC power source 100 of a power system or the like via a passive element 2 having a inductance component. The multi-level converter 1 converts single phase AC power into DC (direct current) power and, thereafter, supplies the DC power to an electrically-operated machine 3. In this embodiment, a vehicle on which the power conversion apparatus 11 is mounted is not limited, and the power conversion apparatus 11 may be mounted on various types of vehicles.

The multi-level converter 1 includes an overvoltage suppression circuit 130 for suppressing an overvoltage in capacitors 15a, 15b of capacitor section 150 in the single-phase 3-level converter 50. A bidirectional bypass switch 120 is connected in parallel with the single-phase 2-level converter 40.

A control module 180 controls the single-phase 3-level converter 50, the single-phase 2-level converter 40, and the bidirectional bypass switch 120. Although the control module 180 is depicted as outside multi-level converter 1, the control module 180 may also be incorporated within the multi-level converter 1.

The single-phase 2-level converter 40 is a single phase converter and includes switching devices 4a to 4d, a capacitor 14a, a resistor 14c, and (reflux) diodes 6a to 6d. The switching devices 4a to 4d may be self-turn-off switching devices (e.g., injection enhanced gate transistors, gate turn off thyristors). The single-phase 2-level converter 40 according to this embodiment is a SiC (silicon carbide) device. By using the SiC device, switching loss can be decreased.

In the single-phase 2-level converter 40, the switching device 4a and the switching device 4b are connected in series. The switching device 4a is connected to a positive potential side of the capacitor 14a, and the switching device 4b connected to a negative potential side of the capacitor 14a. The single-phase 2-level converter 40 has a first connection point 41 (AC input/output point) between the switching device 4a and the switching device 4b. The first connection point 41 is connected to the AC power source 100 via the passive element 2. The diode 6a is connected in reverse parallel with the switching device 4a, and the diode 6b is connected in reverse parallel with the switching device 4b.

The bidirectional bypass switch 120 is connected in parallel with the single-phase 2-level converter 40. In the bidirectional bypass switch 120, a switching device 21a and a switching device 21b are connected in series. A diode 22a is connected in reverse parallel with the switching device 21a, and a diode 22b is connected in reverse parallel with the switching device 21b.

In the single-phase 2-level converter 40, the switching device 4c and the switching device 4d are connected in series. The switching device 4c is connected to a positive potential side of the capacitor 14a, and the switching device 4d is connected to a negative potential side of the capacitor 14a. The single-phase 2-level converter 40 has a second connection point 42 (AC input/output point) between the switching device 4c and the switching device 4d that is connected to the single-phase 3-level converter 50. The diode 6c is connected in reverse parallel with the switching device 4c, and the diode 6d is connected in reverse parallel with the switching device 4c. The resistor 14c is connected in parallel with the capacitor 14a.

Next, the single-phase 3-level converter 50 which is connected between the single-phase 2-level converter 40 and the electrically-operated machine 3 is explained. The single-phase 3-level converter 50 includes two current pathways, a bidirectional switching device 7, the capacitor section 150, and the overvoltage suppression circuit 130. All switching devices 5a to 5f included in the single-phase 3-level converter 50 may be self-turn-off switching devices (e.g., injection enhanced gate transistors, gate turn off thyristors).

One of the current pathways in the single-phase 3-level converter 50 includes the switching device 5a, the switching device 5b, a diode 8a, and a diode 8b. The switching devices 5a, 5b are connected in series. The switching device 5a is connected between a positive potential of the capacitor section 150 and an AC input/output point 42a (a connection point connected to the second connection point 42). The switching device 5b is connected between a negative potential of the capacitor section 150 and the AC input/output point 42a. The diode 8a is connected in reverse parallel with the switching device 5a, and the diode 8b is connected in reverse parallel with the switching device 5b.

The second of the current pathways of the single-phase 3-level converter 50 includes the switching device 5c, the switching device 5d, a diode 8c, and a diode 8d. The switching devices 5c, 5d are connected in series. The switching device 5c is connected between a positive potential of the capacitor section 150 and an AC input/output point 42b (a second connection point to AC power source 100 via passive element 2). The AC input/output point 42b is also connected to bidirectional switching device 7. The switching device 5d is connected between a negative potential of the capacitor section 150 and the AC input/output point 42b. The diode 8c is connected in reverse parallel with the switching device 5c, and the diode 8d is connected in reverse parallel with the switching device 5d.

The bidirectional switching device 7, as stated, is connected to AC input/output point 42b. The bidirectional switching device 7 includes the switching devices 5e, 5f, which are connected to with each other with opposite polarities (e.g., emitter terminal to emitter terminal), and diodes 8e, 8f which are connected in series with opposite polarities (e.g., anode to anode). The diode 8e is connected in reverse parallel with the switching device 5e, and the diode 8f is connected in reverse parallel with the switching device 5f. The bidirectional switching device 7 is connected to the capacitor section 150.

The capacitor section 150 includes the capacitor 15a, the capacitor 15b, a resistor 15c, and a resistor 15d. The capacitor 15a and the capacitor 15b are connected in series to each other. A positive-potential line 10a is connected to a positive side of the capacitor 15a, and the neutral point 9 is connected to a negative side of the capacitor 15a. The neutral point 9 is connected to a positive side of the capacitor 15b, and a negative-potential line 10b is connected to a negative side of the capacitor 15b. The resistor 15c is connected in parallel with the capacitor 15a, the resistor 15d is connected in parallel with the capacitor 15b. In the single-phase 3-level converter 50 according to this first embodiment, a resistor is connected in parallel each capacitor. The capacitor section 150 is connected at point between capacitors 15, 15b with the overvoltage suppression circuit 130. In other words, as depicted in FIG. 1, a point between the capacitors 15a, 15b is connected to the neutral point 9 through overvoltage suppression circuit 130.

The overvoltage suppression circuit 130 includes a resistor 33a, a diode 32a, a switching device 31a, a diode 32b, a switching device 31b, and a resistor 33b. The resistor 33a is connected to the positive-potential line 10a, and the resistor 33a, the switching device 31a and the diode 32a are connected to each other. The switching device 31a and the diode 32a are connected to the neutral point 9. Here, the diode 32a is connected in reverse parallel with the switching device 31a. The neutral point 9, the switching device 31b and the diode 32b are connected to each other. The switching device 31b and the diode 32b are connected to the resistor 33b. The resistor 33b is connected to the negative-potential conductive line 10b. The diode 32b is connected in reverse parallel with the switching device 31b. The overvoltage suppression circuit 130 is connected to the electrically-operated machine 3.

The overvoltage suppression circuit 130 prevents an overvoltage in the capacitors 15a, 15b.

Due to such circuit constitution, even when the overvoltage suppression circuit 130 is provided, the number of switching devices used in the single-phase 3-level converter 50 is 8 (switching devices 5a to 5f, switching device 31a, switching device 31b), and the number of capacitors used in the single-phase 3-level converter 50 becomes 2 (capacitor 15a, capacitor 15b). Accordingly, the number of required parts for the number of output voltage levels can be decreased.

As described previously, the single-phase 2-level converter 40 according to this embodiment is constituted of a silicon carbide device (SiC) or the like which exhibits a small switching loss, and the single-phase 3-level converter 50 is constituted of a silicon device or the like having a high electrical breakdown strength. Accordingly, a switching loss of the single-phase 2-level converter 40 can be less than a switching loss of the single-phase 3-level converter 50. On the other hand, the single-phase 3-level converter 50 has higher breakdown property than the single-phase 2-level converter 40.

In this embodiment, the single-phase 3-level converter 50 is connected to the electrically-operated machine (which may include an inverter or the like) 3 via the positive-potential line 10a and the negative-potential line 10b and hence, the reliability of the single-phase 3-level converter 50 is increased with the provision of the overvoltage suppression circuit 130. On the other hand, it is not necessary for the reliability of the single-phase 2-level converter 40 to be as high as the single-phase 3-level converter 50. Accordingly, on the single-phase 2-level converter 40, the bidirectional bypass switch 120 is provided instead of a protection circuit which includes an overvoltage suppression resistor. Thus, when an overvoltage is generated in any one of the capacitors 15a, 15b, 14a, it is possible to make an electric current bypass the single-phase 2-level converter 40 by operating the bidirectional bypass switch 120 to prevent the electric current from flowing through the single-phase 2-level converter 40. For example, when an overvoltage is generated in the capacitor 14a, bidirectional bypass switch 120 allows electric current to bypass the single-phase 2-level converter 40 such that the electric current does not flow through the single-phase 2-level converter 40 and, thereafter, the capacitor 14a is discharged by the resistor 14c and hence, a voltage of the capacitor 14a can be reduced.

The bidirectional bypass switch 120 includes the switching devices 21a, 21b, and the diodes 22a, 22b and hence, the bidirectional bypass switch 120 may allow decreased device sizes and reduce the number of parts compared to a protective circuit provided with resistors which requires dissipation of heat. Resister 33a, and resistor 32b, for example, may require heat dissipation, which in general requires larger devices.

Figure 2:
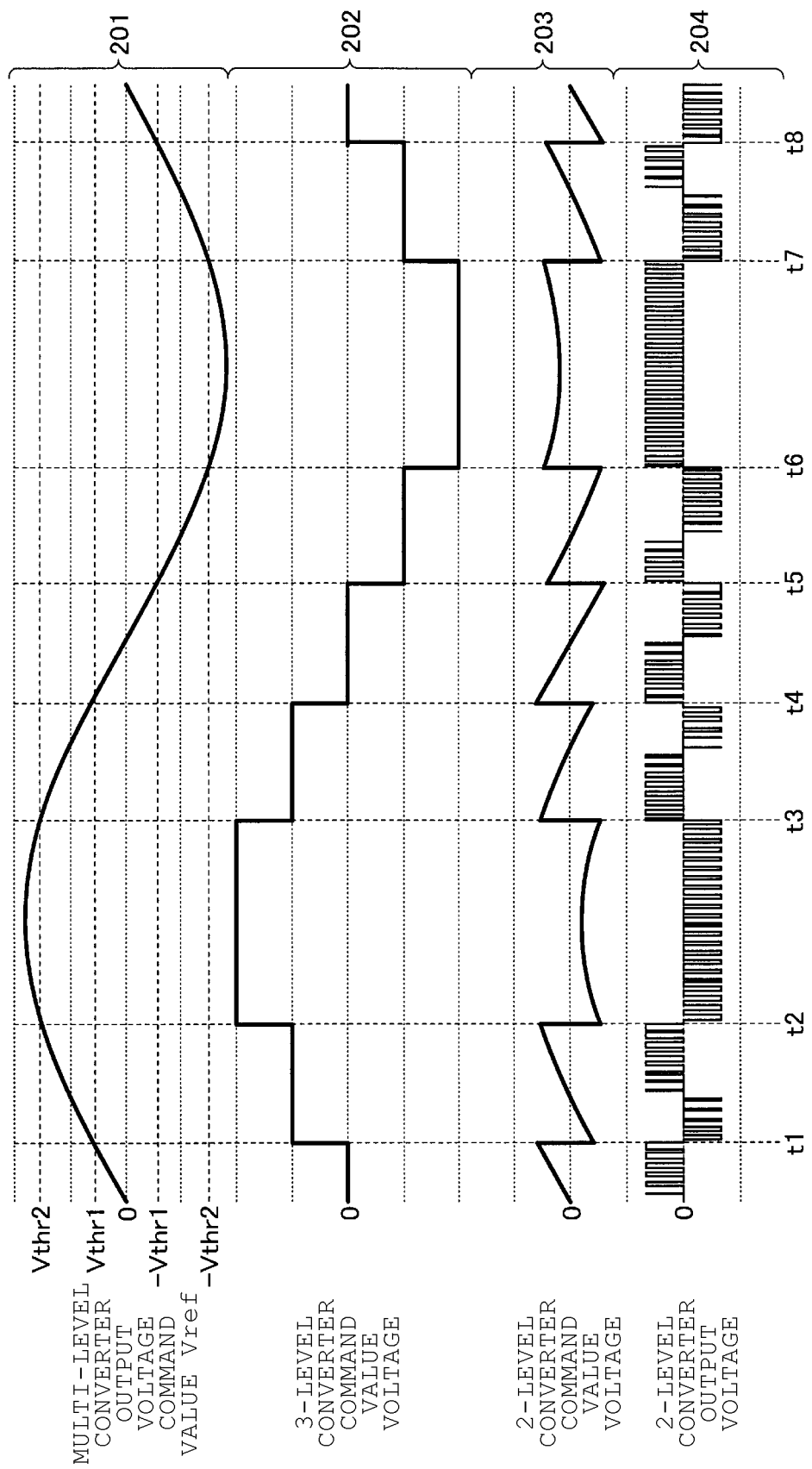
FIG. 2 depicts command value voltages for respective converters corresponding to output voltage commands to the multi-level converter according to the first embodiment.

FIG. 2 depicts command value voltages for respective converters corresponding to an output voltage command transmitted to the multi-level converter 1 according to the first embodiment. In FIG. 2, an output voltage command value Vref 201 for the multi-level converter 1, a command value voltage 202 for the single-phase 3-level converter 50, a command value voltage 203 for the single-phase 2-level converter 40, and an output voltage 204 for the single-phase 2-level converter 40 are depicted.

That is, in the power conversion apparatus 11 according to this embodiment, the output voltage command value Vref 201 for the multi-level converter 1 is realized by combining the command value voltage 202 for the single-phase 3-level converter 50 and the command value voltage 203 for the single-phase 2-level converter 40 with each other.

Then, in the power conversion apparatus 11 according to this embodiment, switching frequency of the single-phase 2-level converter 40 having a low switching loss is set higher than switching frequency of the single-phase 3-level converter 50 and, thereafter, the single-phase 2-level converter 40 is controlled such that the single-phase 2-level converter 40 follows a detailed change in the output voltage command value Vref 201. Due to such a control, a detailed voltage control and the reduction in switching losses can be realized.

In general, an element having a small switching loss such as a silicon carbide device typically has a low electrical breakdown strength. In view of the above, in this embodiment, to allow the single-phase 3-level converter 50 having high electrical breakdown strength to make a large change in voltage, a control with a stepwise waveform is applied to the single-phase 3-level converter 50.

In this embodiment, with respect to the output voltage command value Vref 201 for the multi-level converter 1, threshold values for allowing the capacitors 15a, 15b to generate an output are provided. For example, assume a threshold value of a voltage which allows either one of the capacitors 15a, 15b to generate an output as ±Vthr1. Also assume a threshold value of a voltage which allows both capacitors 15a, 15b to generate an output as ±Vthr2. The control module 180 controls the switching devices 5a to 5f included in the single-phase 3-level converter 50 based on whether or not the output voltage command value Vref exceeds the threshold value of the voltage±Vthr1 and the threshold value of the voltage±Vthr2.

Further, the control module 180 performs a control based on the command value voltage 203 for the single-phase 2-level converter 40 such that the output voltage 204 of the single-phase 2-level converter 40 is acquired. Next, the specific control of the switching device is explained.

Figure 3:
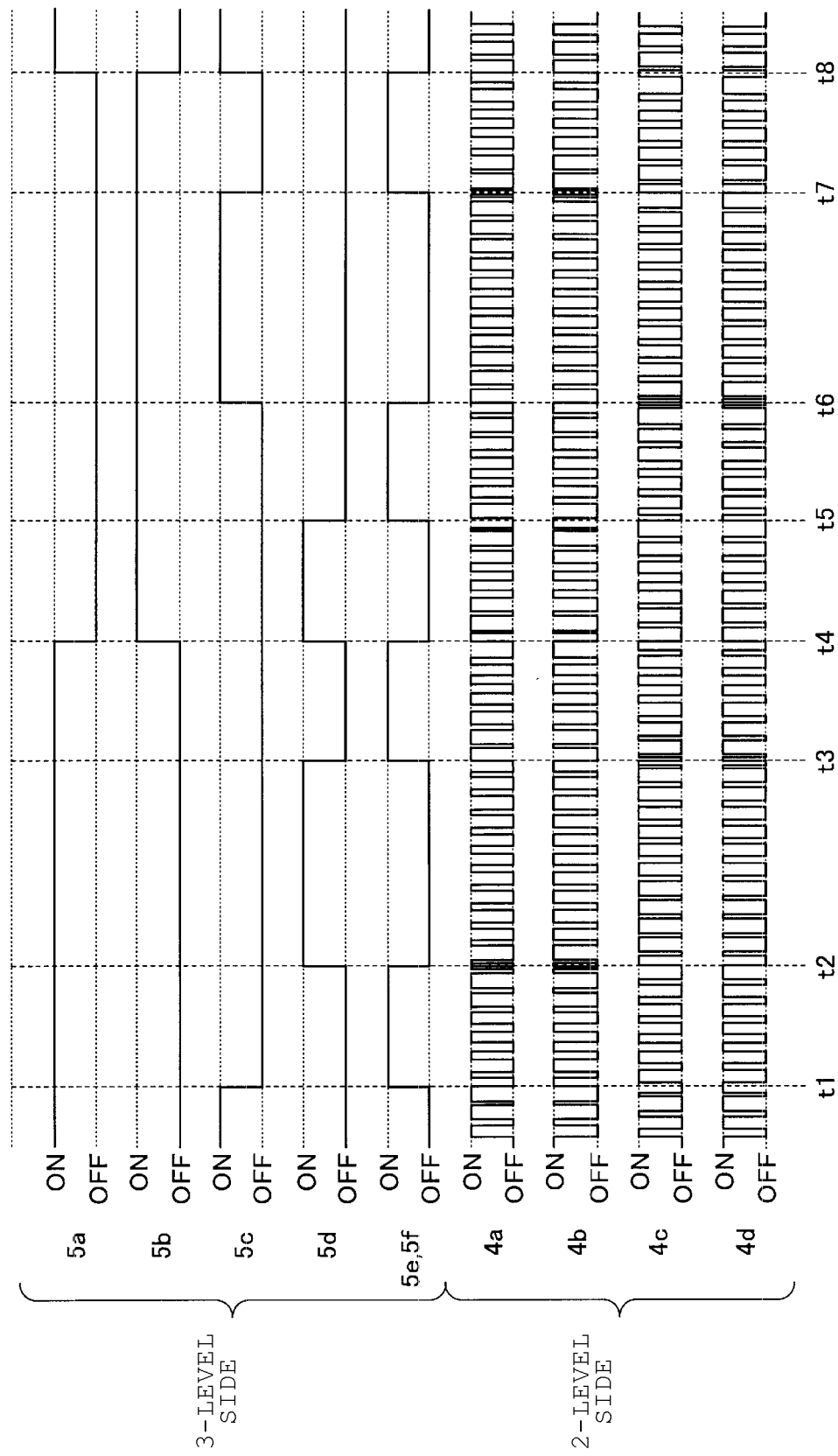
FIG. 3 depicts switch controls performed by respective switching devices included in a single-phase 2-level converter and a single-phase 3-level converter according to the first embodiment.

FIG. 3 shows switch controls performed by switching devices 5a-5f and 4a-4d included in multi-level converter 1. In the example shown in FIG. 3, a switch control of the switching devices 5a to 5f on a single-phase 3-level converter 50 side and a switch control of the switching devices 4a to 4d on a single-phase 2-level converter 40 side are shown.

When a condition of Vthr1≥Vref≥−Vthr1 is satisfied (time 0 to t1, t4 to t5, t8 or after a lapse of t8), the control module 180 brings either one of the combination of the switching device 5a and the switching device 5c included in the single-phase 3-level converter 50 or the combination of the switching device 5b and the switching device 5d included in the single-phase 3-level converter 50 into an ON state. Accordingly, voltages of the capacitors 15a, 15b are not superposed on an output voltage of the converter 50, and the control module 180 outputs an output voltage command value Vref of the whole converter by applying a pulse width modulation control to the single-phase 2-level converter 40.

Figure 4:
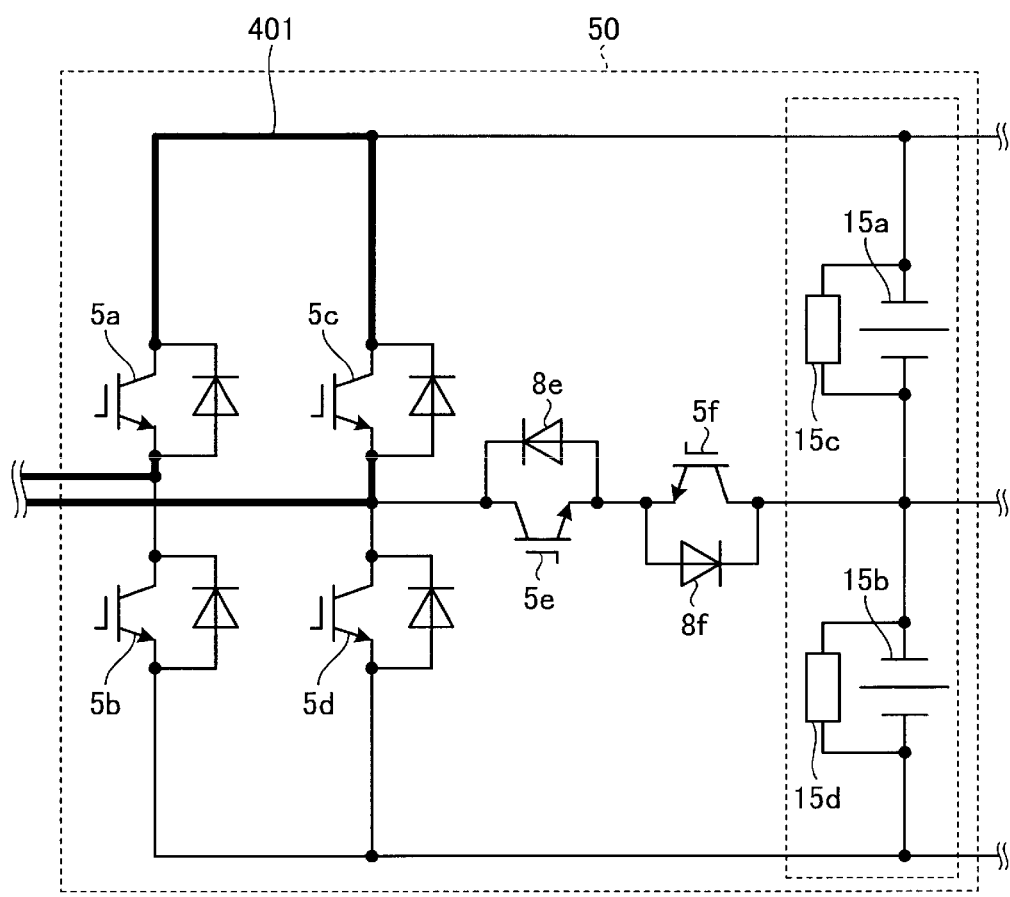
FIG. 4 depicts a current path of the single-phase 3-level converter of the multi-level converter when a condition of $Vthr1 \geq Vref \geq -Vthr1$ is satisfied.

FIG. 4 shows a current path of the single-phase 3-level converter 50 of the multi-level converter 1 when a condition of Vthr1≥Vref≥−Vthr1 is satisfied. In an example shown in FIG. 4, a switching control is made such that the combination of the switching device 5a and the switching device 5c is brought into an ON state and other switching devices 5b, 5d to 5f are brought into an OFF state. In this case, an electric current flows through a path indicated by a bold line 401 and hence, there is no possibility that voltages of the capacitors 15a, 15b are superposed on a converter output voltage of the converter 50. Although FIG. 4 shows an example where only the combination of the switching device 5a and the switching device 5c is brought into an ON state, it may also be possible to adopt as an example where only the combination of the switching device 5b and the switching device 5d is brought into an ON state.

Returning to FIG. 3, when a condition of Vthr2≥Vref>Vthr1 is satisfied (time t1 to t2, t3 to t4), the control module 180 performs a control such that the switching devices 5a, 5e, 5f included in the single-phase 3-level converter 50 are brought into an ON state. Due to such a control, a voltage of the capacitor 15a is added to a converter output voltage of the converter 50 and hence, the single-phase 2-level converter 40 outputs a differential voltage which is obtained by subtracting a voltage of the capacitor 15a from the output voltage command value Vref of the whole converter to the converter 50 in accordance with a pulse width modulation control performed by the control module 180.

Figure 5:
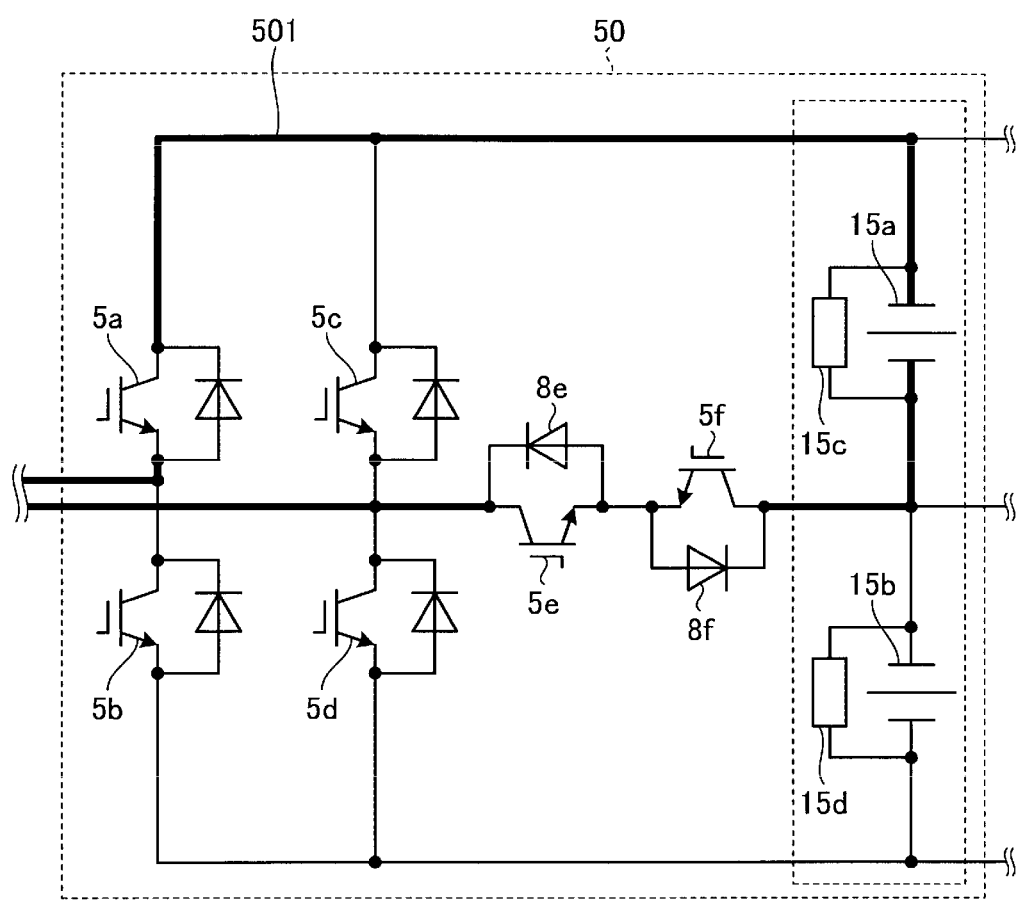
FIG. 5 depicts a current path of the single-phase 3-level converter of the multi-level converter when a condition of $Vthr2 \geq Vref > Vthr1$ is satisfied.

FIG. 5 shows a current path of the single-phase 3-level converter 50 when a condition of Vthr2≥Vref>Vthr1 is satisfied. In the example shown in FIG. 5, a switching control is made such that only the combination of switching devices 5a, 5e, 5f is brought into an ON state and other switching devices are brought into an OFF state. In this case, an electric current flows through a path indicated by a bold line 501 and hence, only a voltage of the capacitor 15a is superposed on the output voltage of the converter 50.

Returning to FIG. 3, when a condition of Vref>Vthr2 is satisfied (time t2 to t3), the control module 180 brings the switching devices 5a, 5d included in the single-phase 3-level converter 50 into an ON state. Due to such a control, voltages of the capacitors 15a, 15b are added to the output voltage of the converter 50 and hence, the single-phase 2-level converter 40 outputs a differential voltage which is obtained by subtracting voltages of the capacitors 15a, 15b from the output voltage command value Vref of the whole converter to the converter 50 in accordance with a pulse width modulation control performed by the control module 180.

Figure 6:
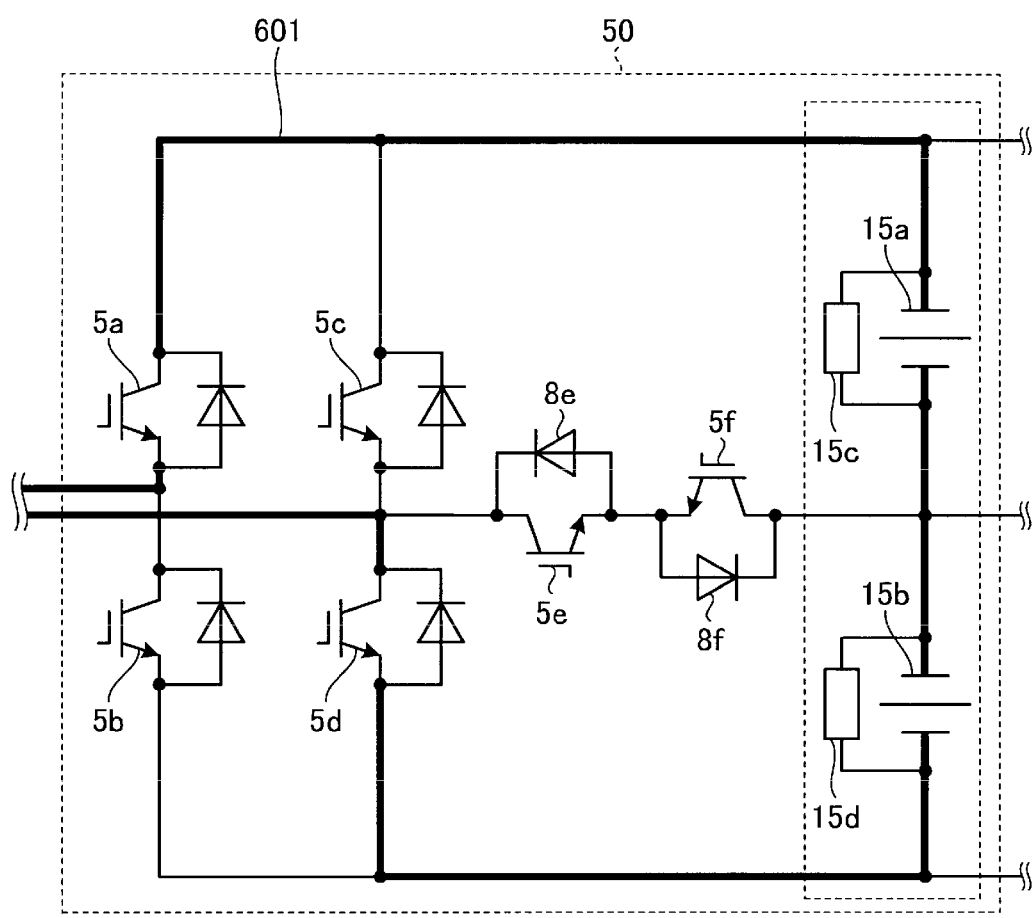
FIG. 6 depicts a current path of the single-phase 3-level converter of the multi-level converter when a condition of $Vref > Vthr2$ is satisfied.

FIG. 6 shows a current path of the single-phase 3-level converter 50 when a condition of Vref>Vthr2 is satisfied. In the example shown in FIG. 6, a switch control is made such that only the combination of the switching device 5a and the switching device 5d is brought into an ON state. In this case, an electric current flows through a path indicated by a bold line 601 and hence, voltages of the capacitors 15a, 15b are superposed on the output voltage of the converter 50.

Returning to FIG. 3, when a condition of −Vthr1>Vref≥−Vthr2 is satisfied (time t5 to t6, t7 to t8), the control module 180 brings the switching devices 5b, 5e and 5f included in the single-phase 3-level converter 50 into an ON state. Due to such a control, a voltage of the capacitor 15b is subtracted from the output voltage of the converter 50 and hence, the single-phase 2-level converter 40 outputs a differential voltage obtained by adding a voltage of the capacitor 15a to the output voltage command value Vref of the whole converter to the converter 50 in accordance with a pulse width modulation control performed by the control module 180.

When a condition of −Vthr2>Vref is satisfied (time t6 to t7), the control module 180 brings the switching devices 5b, and 5c included in the single-phase 3-level converter 50 into an ON state. Due to such a control, voltages of the capacitors 15a, 15b are subtracted from the output voltage of the converter 50 and hence, the single-phase 2-level converter 40 outputs a differential voltage obtained by adding voltages of the capacitors 15a, 15b to the output voltage command value Vref of the whole converter to the converter 50 in accordance with a pulse width modulation control performed by the control module 180.

In this manner, the control module 180 of this embodiment controls the switching devices 5a to 5f included in the single-phase 3-level converter 50 in accordance with predetermined voltage incremental values (threshold value±Vthr2, threshold value±Vthr1). Then, the control module 180 controls the switching devices 4a to 4d included in the single-phase 2-level converter 40 corresponding to a change in output voltage smaller than a predetermined voltage.

By performing the above-mentioned control, the power conversion apparatus 11 of this embodiment can decrease the number of times the respective switching devices 5a to 5f switch to 4 times per one period of the output voltage. In this embodiment, however, the number of times of switching is not limited to 4 times and this value may change depending on the number of threshold values or the like. The number of switching times can be further decreased by decreasing the number of threshold values. For example, the number of times of switching may be 1 time, 2 times, or 3 times or the like.

The single-phase 3-level converter 50 generates a stepwise waveform which becomes a basis of the output voltage of the multi-level converter 1. The single-phase 3-level converter 50 is constituted of a silicon element and hence, although the switching loss is generally high, the single-phase 3-level converter 50 exhibits a high electrical breakdown strength. In this embodiment, however, a stepwise waveform is adopted as the output waveform of the single-phase 3-level converter 50 and hence, the number of times of switching per one period can be reduced. Accordingly, the number of times of switching can be limited and hence, the switching loss can be decreased.

The single-phase 2-level converter 40 performs a high speed switching control for compensating for a voltage difference between the output stepwise waveform of the single-phase 3-level converter 50 and the desired overall output of the multi-level converter output voltage. In this manner, the single-phase 2-level converter 40 compensates for the voltage difference between the stepwise waveform from the single-phase 3-level converter 50 and the desired multi-level converter output voltage.

In this embodiment, the single-phase 2-level converter 40 can be used for compensating for relatively small voltage differences by properly setting the threshold value voltages Vthr1, Vthr2 and hence, a high voltage output from the single-phase 2-level converter 40 is unnecessary, thus it is possible to use switching elements having a low electrical breakdown strength in converter 40. That is, by setting Vthr1 and Vthr2 to provide voltage levels near the desired overall output voltage values, the voltage level provided by the single-phase 2-level converter 40 can be relatively small. The single-phase 2-level converter 40 also performs a high speed switching control for compensating for a voltage difference between a stepwise waveform of the single-phase 3-level converter 50 and an AC input/output voltage of the whole multi-level converter 1. In this embodiment, losses due to high speed switching can be reduced by using a silicon carbide component as the single-phase 2-level converter 40.

The single-phase 3-level converter 50 uses an element exhibiting a high electrical breakdown strength such as a silicon-based component.

Even when a silicon-based component with large switching losses is used as the single-phase 3-level converter 50, overall switching losses can be decreased as compared to a conventional pulse width modulation control method using a triangular wave because fewer switchings are required. Accordingly, switching losses can be decreased. That is, not only it is possible to reduce switching losses by using a silicon carbide component or the like as the single-phase 2-level converter 40, but also it is also possible to decrease a switching loss in the single-phase 3-level converter 50 by reducing the number of switchings required by converter 50 for output of the desired waveform. Accordingly, a switching loss of multi-level converter 1 can be further decreased.

Figure 7:
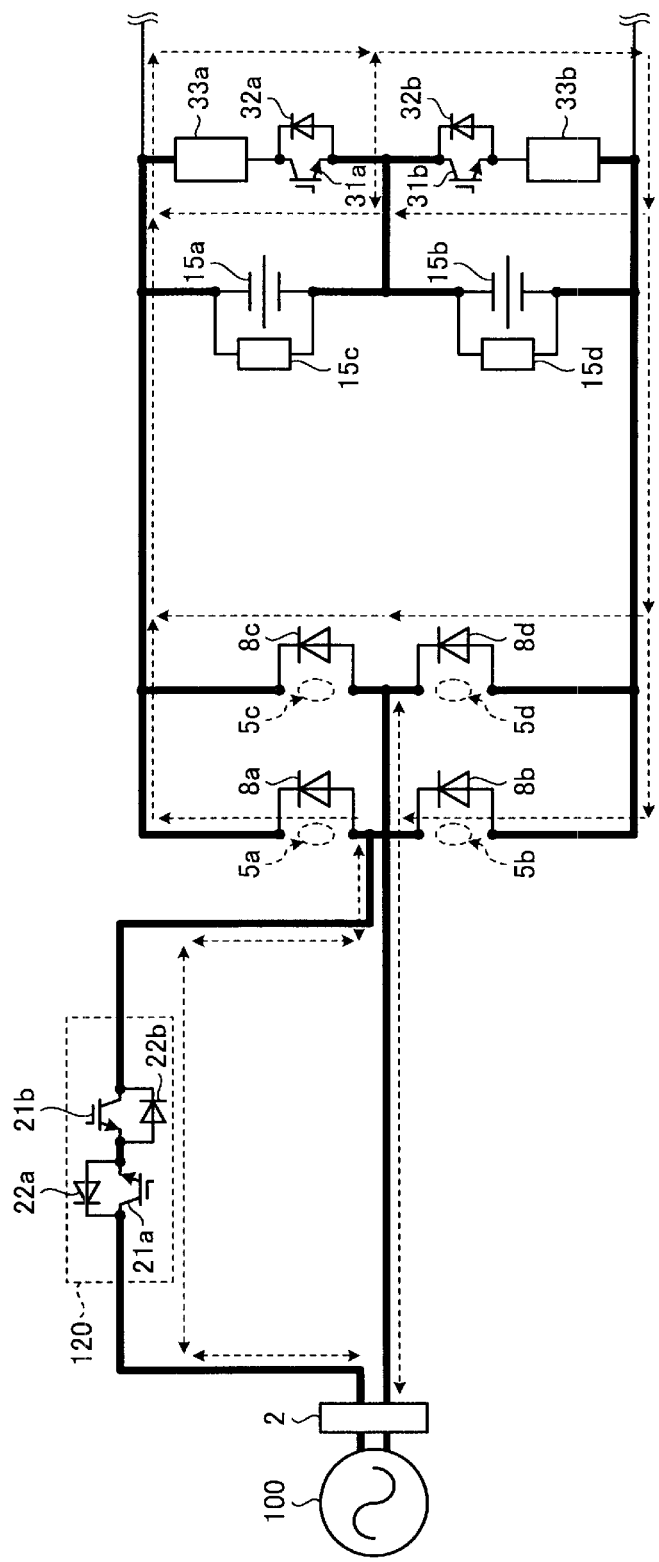
FIG. 7 depicts a current path when a bidirectional bypass switch and an overvoltage suppression circuit according to the first embodiment are operated.

Next, the manner of operation of the power conversion apparatus 11 of this embodiment at a capacitor overvoltage time is explained. When the capacitor 14a or either one of the capacitors 15a, 15b exceeds an upper-limit threshold voltage value, the control module 180 operates the bidirectional bypass switch 120 and the overvoltage suppression circuit 130. The control module 180 also performs a control bringing all of the switching devices 5a to 5e and all of the switching devices 4a to 4d into an OFF state (open state). FIG. 7 shows a current path when the bidirectional bypass switch 120 and the overvoltage suppression circuit 130 are operated. With respect to upper-limit threshold voltage values, it is assumed that proper values are set in the respective capacitors 15a, 15b, 14a.

That is, the control module 180 performs a control such that when the control module 180 detects that one of voltages at the capacitors 14a, 15a, 15b exceeds the upper-limit threshold voltage value, as shown in FIG. 7, the switching devices 31a, 31b of the overvoltage suppression circuit 130 are brought into an ON state (supplying electricity to the switching device 31a, 31b). At this point of time, the control module 180 also performs a control of bringing the switching devices 21a, 22b of the bidirectional bypass switch 120 into an ON state.

Due to such a control, as indicated by the current path shown in FIG. 7, an electric current flows into the resistors 33a, 33b in the inside of the overvoltage suppression circuit 130. These resistors 33a, 33b have small resistance values compared to the resistors 15c, 15d. Accordingly, a large electric current flows into the resistors 33a, 33b and hence, voltages at the capacitors 15a, 15b can be lowered quickly. On the other hand, an electric current does not flow into the single-phase 2-level converter 40 and hence, an overvoltage generated in the capacitor 14a is discharged by the resistor 14c whereby an overvoltage of the capacitor 14a can be suppressed.

On the other hand, resistance values of the resistors 15c, 15d are large and hence, an electric current hardly flows into the resistors 15c, 15d. However, when the overvoltage suppression circuit 130 is not operated in spite of the generation of an overvoltage in the capacitors 15a, 15b, electricity stored in the capacitors 15a, 15b flows into the resistors 15c, 15d and hence, the generation of an overvoltage at the capacitors 15a, 15b can be suppressed.

This embodiment has been explained in conjunction with the case where when an overvoltage is generated in one of the capacitors 15a, 15b, 14a, the overvoltage suppression circuit 130 and the bidirectional bypass switch 120 are operated. However, this embodiment is not limited to such an example, and this embodiment is applicable to a case where the control module 180 detects abnormality.

As an abnormality which the control module 180 detects, for example, an abnormality which occurs in the inside of the power conversion apparatus 11, an abnormality which occurs around the power conversion apparatus 11 (e.g., in other components such as a power supply), or an abnormality which occurs in the electrically operated machine 3 (e.g., a vehicle or the like) on which the power conversion apparatus 11 is mounted or the like is considered.

As the abnormality in the inside of the power conversion apparatus 11, for example, a case where a temperature of one of respective elements in the inside of the power conversion apparatus 11 exceeds an allowable value is considered.

As the abnormality around the power conversion apparatus 11, for example, a case where a power source voltage is lowered, a case where short-circuiting is detected or a case where a failure signal transmitted from other equipment is received in a control system around the power conversion apparatus 11 is considered.

As the abnormality in the vehicle, for example, a case where abnormality (overcurrent, for example) occurs in an overhead line or the like is considered.

In the power conversion apparatus 11 of this embodiment, it is possible to protect the capacitors 14a, 15a, 15b or the like of the power conversion apparatus 11 by operating the bidirectional bypass switch 120 and the overvoltage suppression circuit 130 when abnormality occurs.

Modification 1 of First Embodiment

In the first embodiment, the explanation has been made with respect to the example where the bidirectional bypass switch 120 and the overvoltage suppression circuit 130 are operated when an overvoltage occurs in one of the capacitors 14a, 15a, 15b. In this case, neither one of the single-phase 2-level converter 40 and the single-phase 3-level converter 50 can be used. However, even if the single-phase 2-level converter 40 cannot be used, control of an output voltage is possible by using only the single-phase 3-level converter 50, although a loss of electric power is large. Accordingly, in the modification 1 of the first embodiment, the explanation is made with respect to an example where an output voltage is controlled by using only the single-phase 3-level converter 50.

For example, when a voltage at the capacitor 14a becomes an overvoltage and exceeds an upper-limit threshold voltage value and, at the same time, voltages at the capacitors 15a, 15b fall within upper-limit threshold voltage values, although the single-phase 2-level converter 40 cannot be used, the single-phase 3-level converter 50 can be used.

Accordingly, when a voltage at the capacitor 14a becomes an overvoltage and exceeds an upper-limit threshold voltage value and, at the same time, voltages at the capacitors 15a, 15b fall within upper-limit threshold voltage values, the control module 180 performs a control of continuing the operation by operating the switching devices 21a, 21b of the bidirectional bypass switch 120, by bringing the respective switching devices 4a to 4d of the single-phase 2-level converter 40 into an OFF state (open state), and by operating the respective switching devices 5a to 5f of the single-phase 3-level converter 50. The control module 180 does not perform a control of operating the overvoltage suppression circuit 130.

Figure 8:
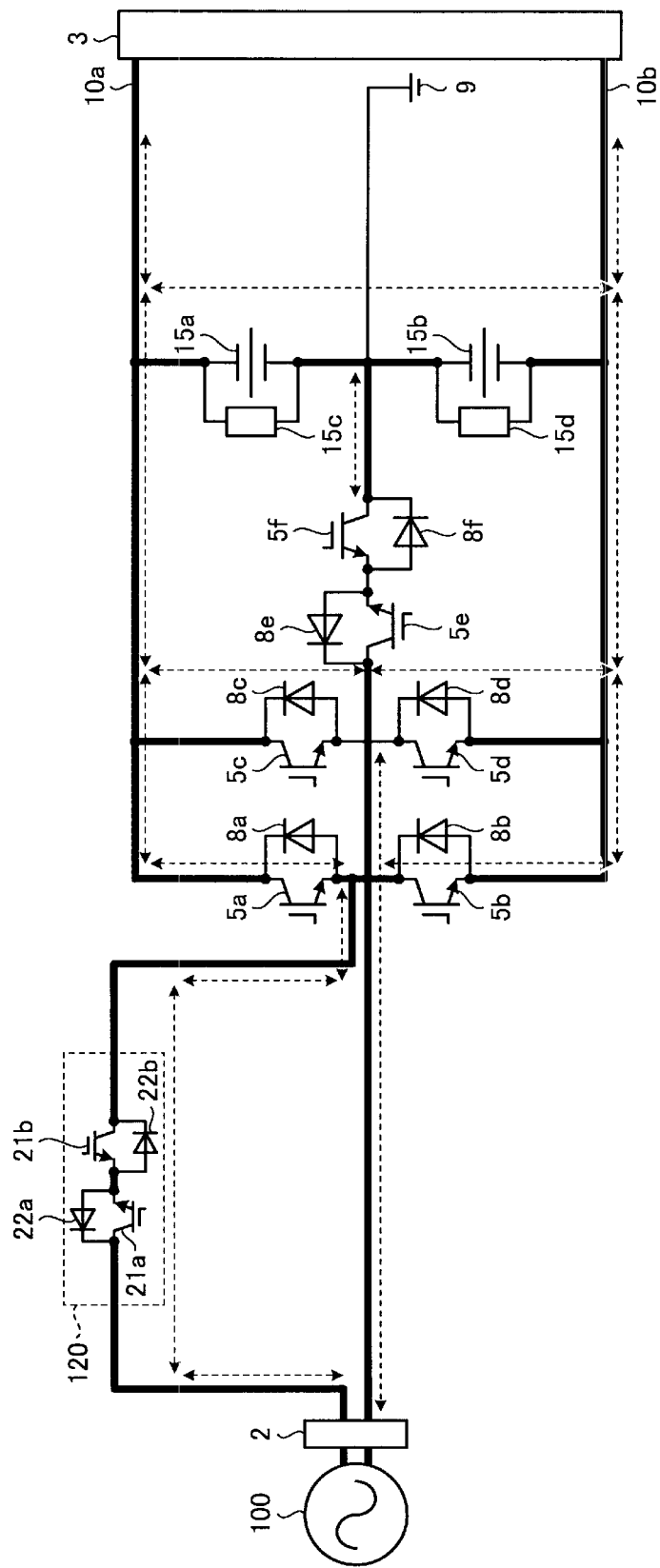
FIG. 8 depicts a current path when a bidirectional bypass switch is operated in a power conversion apparatus according to a modification of the first embodiment.

FIG. 8 shows a current path when the bidirectional bypass switch 120 is operated in this modification. In the current path described in the example shown in FIG. 8, an electric current does not flow into the capacitor 14a and hence, an overvoltage generated in the capacitor 14a can be discharged by the resistor 14c. On the other hand, the control module 180 controls an output voltage by controlling the switching devices 5a to 5f.

Figure 9:
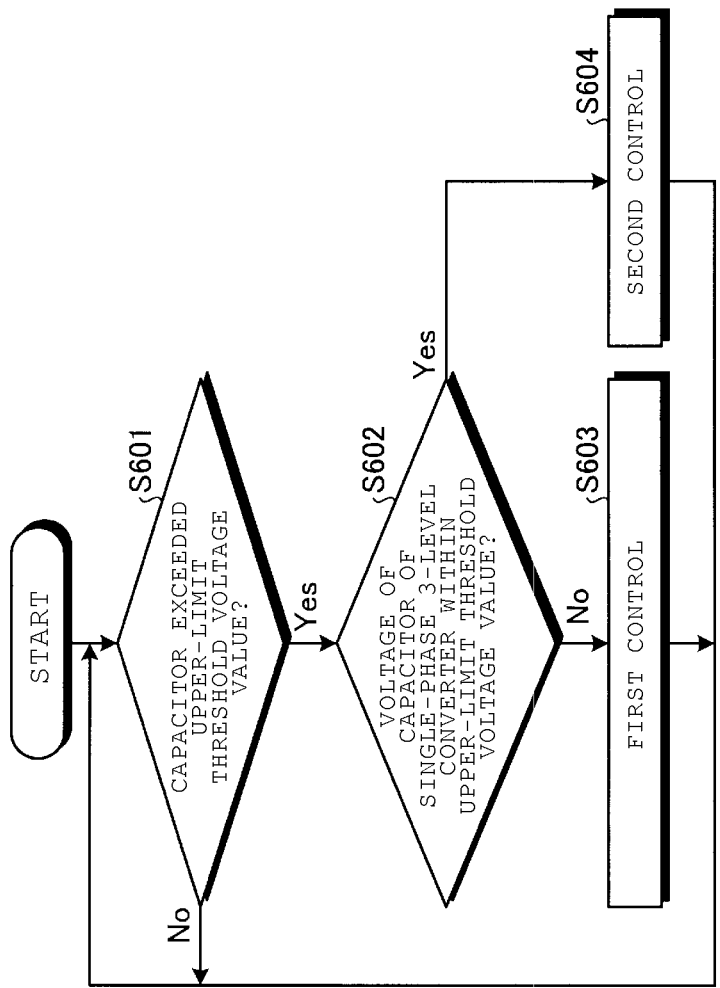
FIG. 9 is a flowchart depicting processing when an overvoltage is generated in a capacitor in the power conversion apparatus according to the modification of the first embodiment.

The control performed in the modification may be combined with the control performed in the first embodiment. FIG. 9 is a flowchart showing steps of the above-mentioned processing in the power conversion apparatus 11 according to this modification.

As shown in FIG. 9, the control module 180 determines whether or not a voltage in one of the capacitors 14a, 15a, 15b exceeds an upper-limit threshold voltage value (step S601). When the voltage does not exceed the upper-limit threshold voltage value (step S601: No), processing in step S601 is repeated.

On the other hand, when the control module 180 determines that a voltage in one of the capacitors 14a, 15a, 15b exceeds the upper-limit threshold voltage value (step S601: Yes), the control module 180 determines whether or not voltages of the capacitors 15a, 15b fall within the upper-limit threshold voltage values (step S602). When the voltages of the capacitors 15a, 15b converter 50 do not fall within the upper-limit threshold voltage values (step S602: No), the control module 180 performs, as a first control, a control of operating the bidirectional bypass switch 120 and the overvoltage suppression circuit 130 in the same manner as the first embodiment (step S603).

When the voltages of the capacitors 15a, 15b fall within the upper-limit threshold voltage values (step S602: Yes), the control module 180 performs, as a second control, a control of operating the bidirectional bypass switch 120 and operating the single-phase 3-level converter 50 in a state where the overvoltage suppression circuit 130 is stopped in the same manner as the above-mentioned control (step S604).

In this modification, when an overvoltage is generated in a capacitor, the processing is switched depending on whether or not voltages of the capacitors 15a, 15b fall within the upper-limit threshold voltage values to allow performing an operation control to control output voltage as much as possible when an abnormality occurs.

Modification 2 of First Embodiment

In the above-mentioned embodiment and the modification 1, the explanation is made with respect to the case where an overvoltage is generated in a capacitor. However, the control using the bidirectional bypass switch 120 is not limited to the case where an overvoltage is generated in a capacitor, and may be performed in a case where a low voltage is generated in the capacitor.

Accordingly, in the modification 2 of the first embodiment, the explanation is made with respect to control which is performed when a voltage of either one of the capacitors 15a, 15b becomes lower than a lower-limit threshold voltage value. In the modification 2 of the first embodiment, when a voltage of either one of the capacitors 15a, 15b becomes lower than the lower-limit threshold voltage value, it is desirable to perform control to increase the voltage of the capacitor 15a, 15b.

Accordingly, a control module 180 according to the modification 2 of the first embodiment performs a control where when a voltage of either one of the capacitors 15a, 15b becomes lower than a lower-limit threshold voltage value, the bidirectional bypass switch 120 is operated so as to increase electric power of the capacitor 15a, 15b. The overvoltage suppression circuit 130 is also held in a stopped state.

Figure 10:
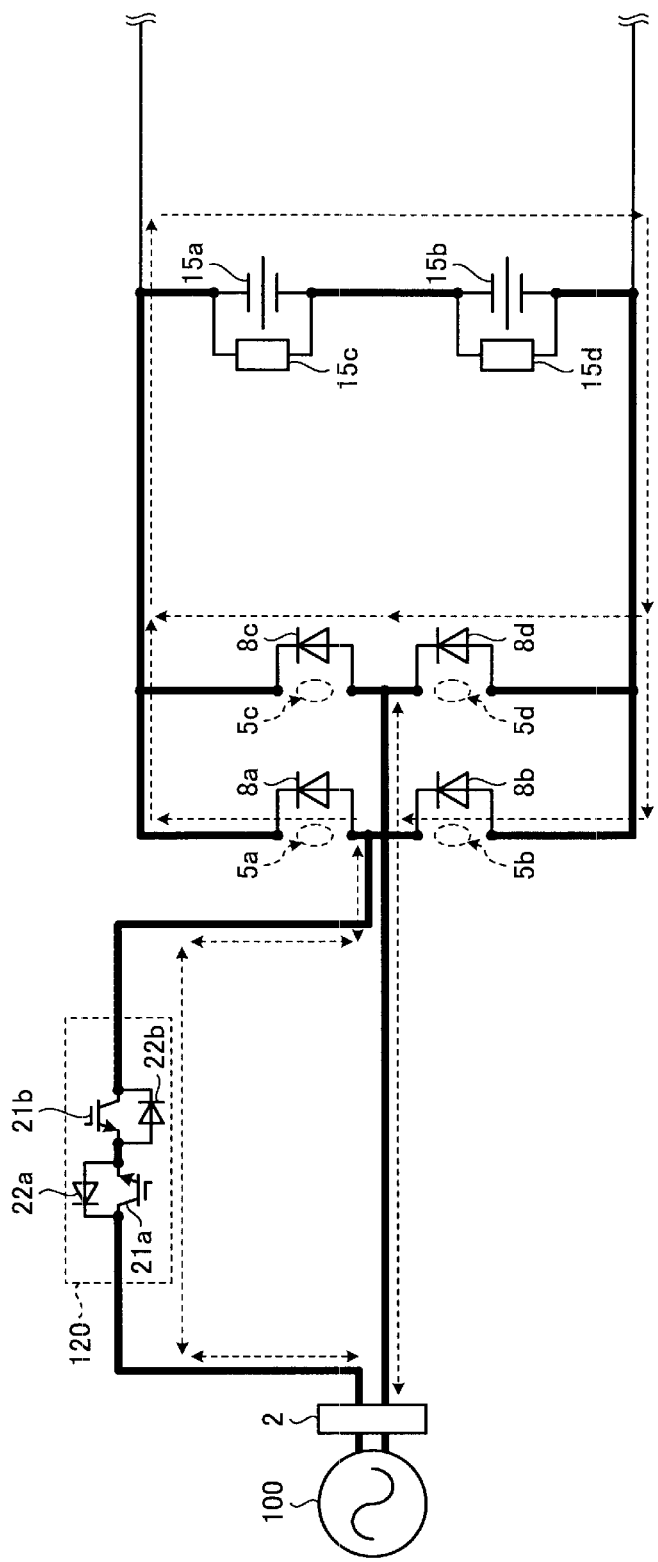
FIG. 10 depicts a current path when a bidirectional bypass switch is operated and a switching device of a single-phase 3-level converter is brought into an OFF state in a control performed by a control module according to a second modification of the first embodiment.

FIG. 10 shows a control performed by the control module 180 according to the modification 2 of the first embodiment. That is, FIG. 10 shows a current path formed when the bidirectional bypass switch 120 is operated and the switching devices 5a to 5f are brought into an OFF state (open state). By forming the current path as shown in FIG. 10, it is possible to charge the capacitors 15a, 15b.

Second Embodiment

Figure 11:
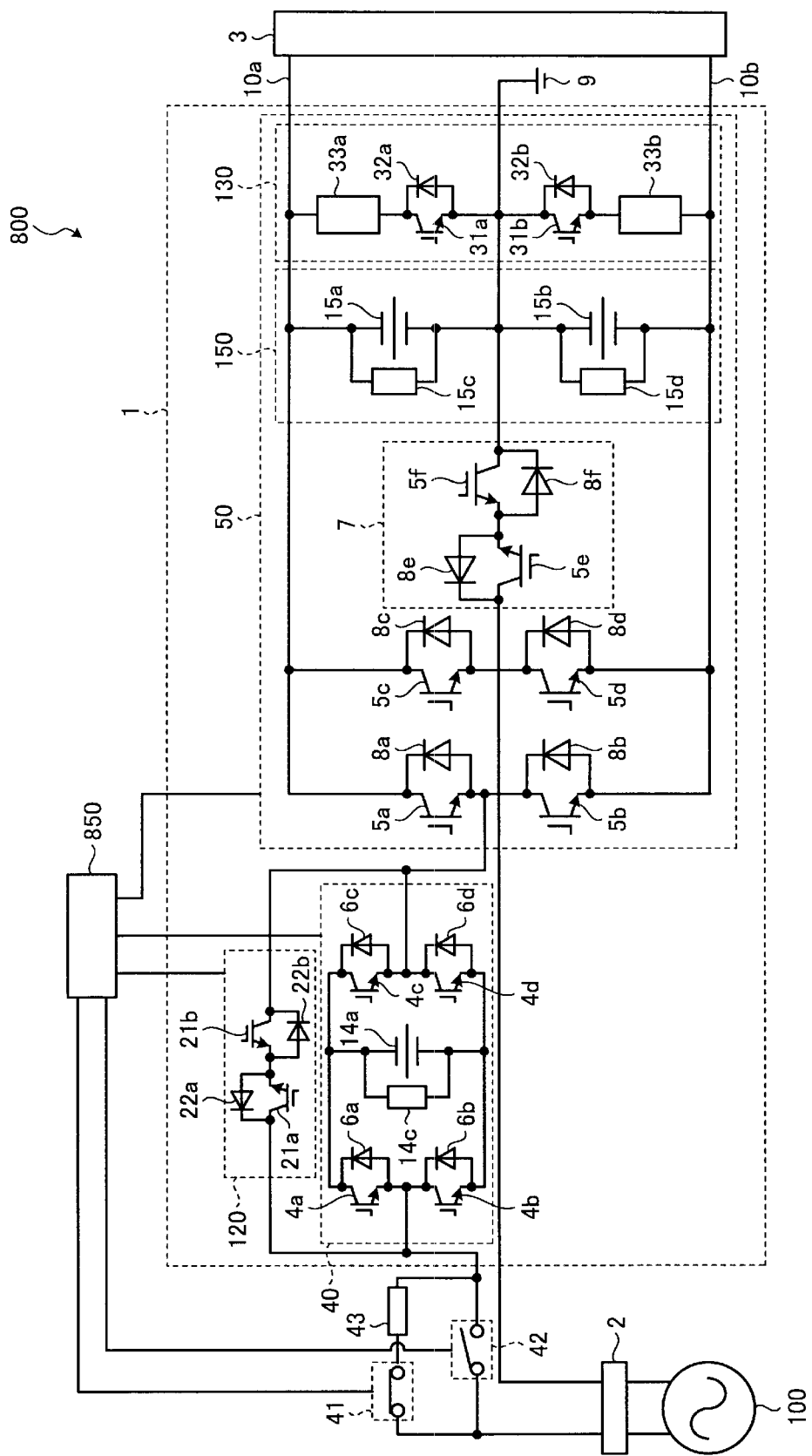
FIG. 11 depicts a multi-level converter of a power conversion apparatus according to the second embodiment.

In the second embodiment, the explanation is made with respect to a case where initial charging is applied to a multi-level converter 1. FIG. 11 depicts a multi-level converter 1 of a power conversion apparatus according to the second embodiment. A power conversion apparatus 800 of this embodiment includes, as the constitution for performing initial charging, a switching device 41, a switching device 42 and a resistor 43 when compared with the power conversion apparatus 11 of the first embodiment. Further, in the power conversion apparatus 800 according to this embodiment, the control module 180 is changed to a control module 850 which differs from the control module 180 in processing.

The switching device 42 is connected between passive element 2 and single-phase 2-level converter 40. The switching device 41 and the resistor 43 which are connected in series are connected in parallel to the switching device 42. That is, the serial element formed by switching device 41 and resistor 43 is connected in parallel to switching device 42. Furthermore, one end of the switching device 41 is connected to the passive element 2, and one end of the resistor 43 is connected to the single-phase 2-level converter 40.

The control module 850 starts charging of capacitors 14a, 15a, 15b as part of an initial charging technique. Although the capacitor 14a and the capacitors 15a, 15b differ from each other in desired initial voltage values, the initial voltage values are decided based on capacitor ratios of the respective capacitors.

In this embodiment, an example is described where the capacitors 15a, 15b have larger desired initial voltage values than the capacitor 14a.

The control module 850 performs a control such that, when an initial voltage of the capacitor 14a reaches a desired initial voltage value, the control module 850 controls bidirectional bypass switch 120 and which causes the charging of the capacitors 15a, 15b to continue, and the charging of the capacitor 14a to be stopped.

Figure 12:
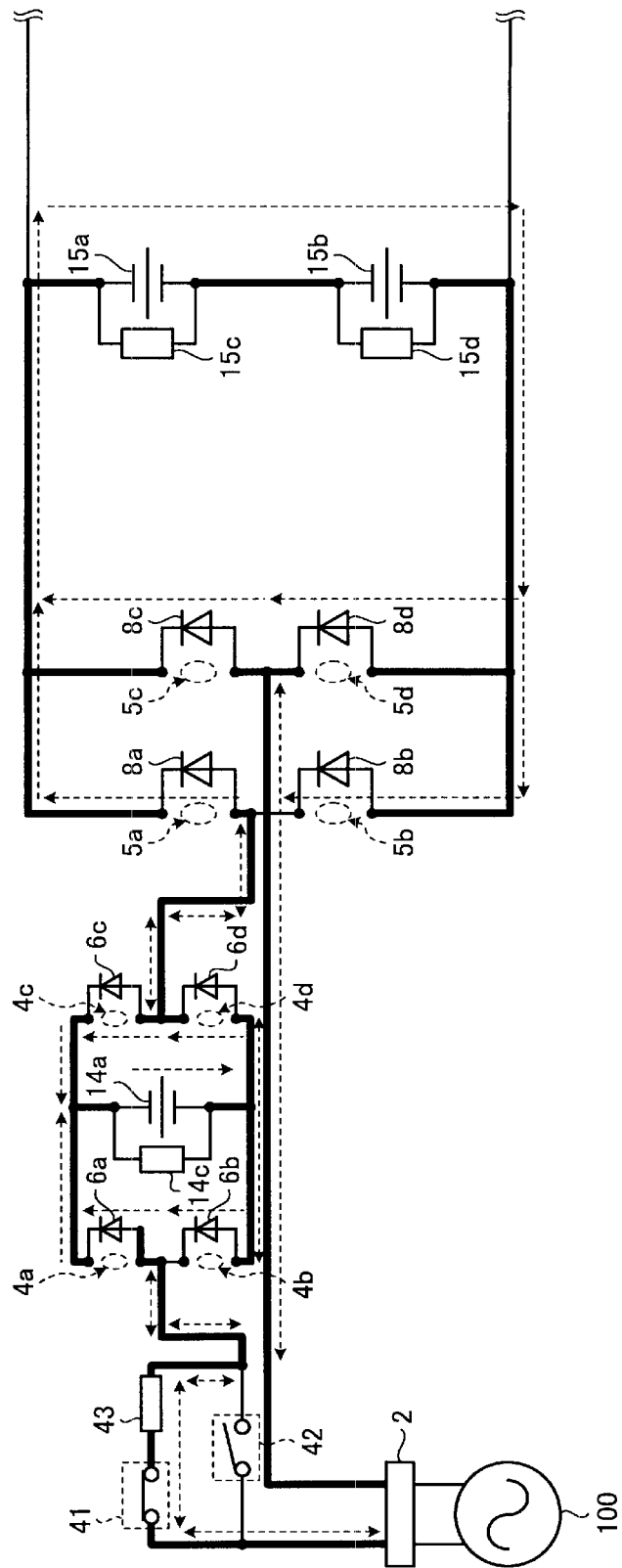
FIG. 12 depicts a current path when a control module according to the second embodiment starts charging of respective capacitors.

FIG. 12 shows a current path when the control module 850 starts charging of the capacitor 14a and the capacitors 15a, 15b. In the example shown in FIG. 12, the control module 850 performs a control where the bidirectional bypass switch 120 and a overvoltage suppression circuit 130 are stopped after switching devices 4a to 4d are brought into an OFF state and switching devices 5a to 5f are brought into an OFF state, and the switching device 41 is brought into an ON state. Charging of the capacitors 14a, 15a, 15b starts when the current path shown in FIG. 12 is formed.

Figure 13:
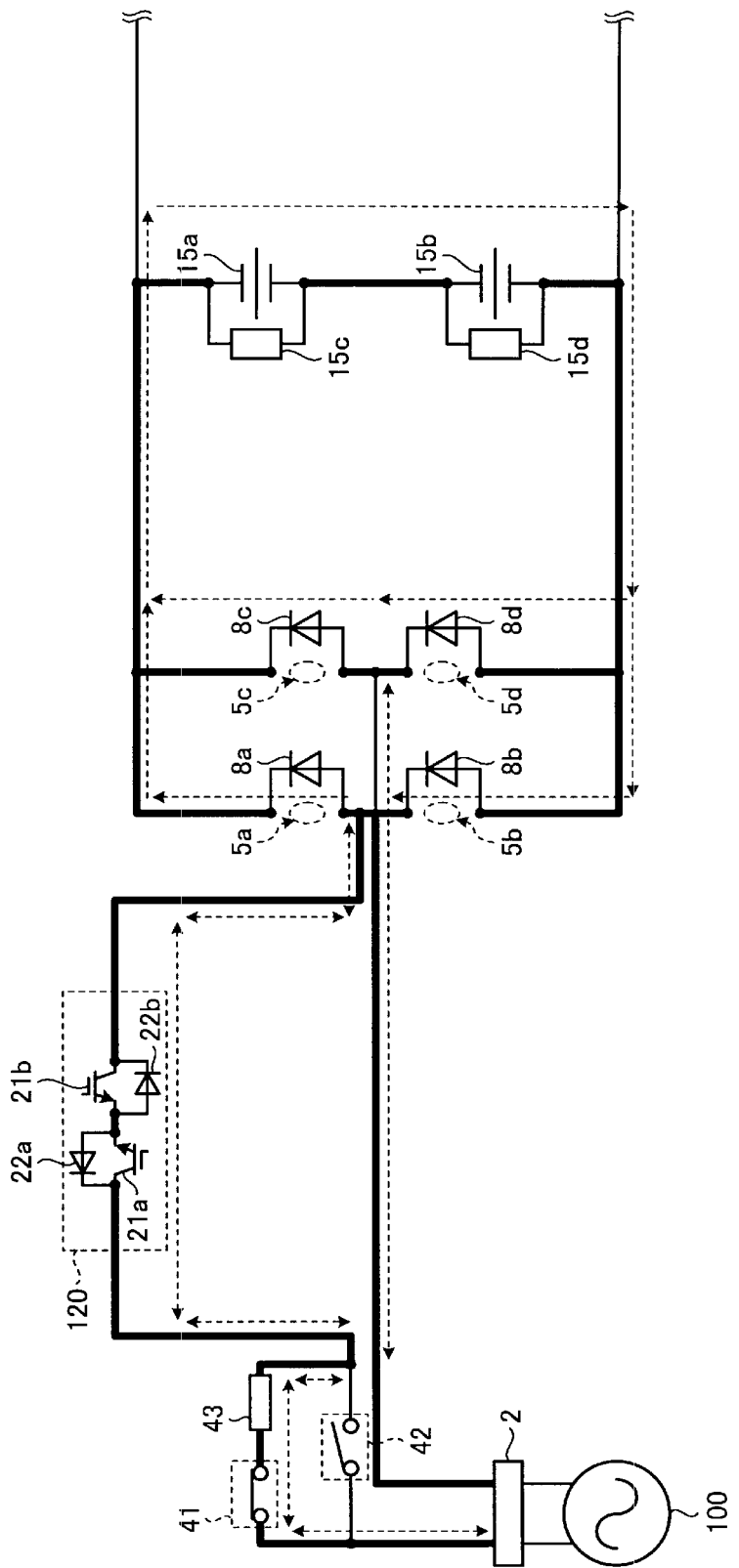
FIG. 13 depicts a current path when the control module according to the second embodiment continues charging only to capacitors of a single-phase 3-level converter since an initial voltage of a capacitor of a single-phase 2-level converter reaches a desired initial voltage value.

FIG. 13 shows a current path when the control module 850 continues charging only to the capacitors 15a, 15b since an initial voltage of the capacitor 14a reaches a desired initial voltage value. In the example shown in FIG. 13, the control module 850 controls the bidirectional bypass switch 120 so that charging of the capacitor 14a is stopped and charging of the capacitors 15a, 15b is continued. In this manner, the control module 850 performs a control such that charging of the capacitor 14a is not performed until charging of the capacitors 15a, 15b is completed.

Figure 14:
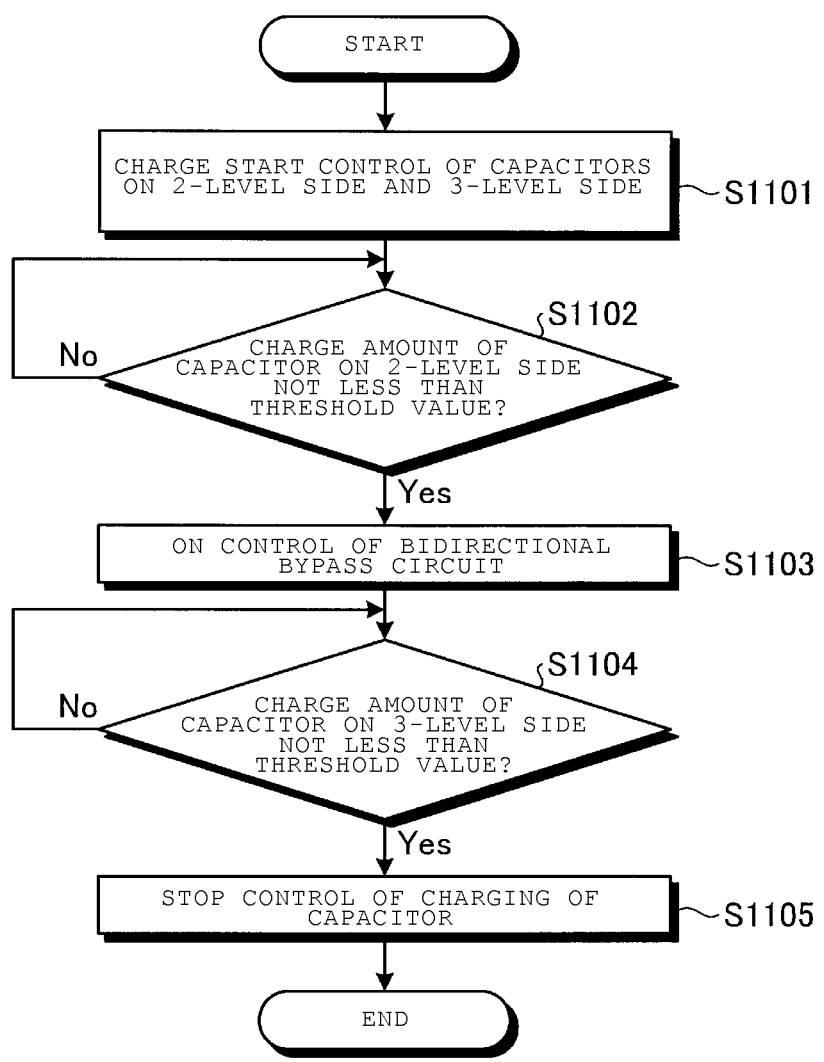
FIG. 14 is a flowchart depicting steps of initial charging processing in the power conversion apparatus according to the second embodiment.

Next, the explanation is made with respect to initial charging processing in the control module 850 of the power conversion apparatus 800 of this embodiment. FIG. 14 is a flowchart showing steps of the above-mentioned processing in the power conversion apparatus 800 according to this embodiment.

As shown in FIG. 14, the control module 850 performs a charge start control of the capacitor 14a and the capacitors 15a, 15b (step S1101). Due to such a charge start control, charging of the capacitors 14a, 15a, 15b starts using the current path shown in FIG. 12.

Next, the control module 850 determines whether or not the initial voltage of the capacitor 14a reaches a desired initial voltage value, that is, whether or not a charge amount of the capacitor 14a exceeds a threshold value (step S1102). When the control module 850 determines that the initial voltage of the capacitor 14a has not yet reached the desired initial voltage value (step S1102: No), the control module 850 continues charging using the current path shown in FIG. 12, and performs the determination in step S1102 again.

On the other hand, when the control module 850 determines that the initial voltage of the capacitor 14a has reached the desired initial voltage value (step S1102: Yes), the control module 850 controls the bidirectional bypass switch (circuit) 120 so as to operate the bidirectional bypass switch 120 (step S1103). Due to such a control, the control module 850 starts charging using the current path shown in FIG. 13.

Next, the control module 850 determines whether or not initial voltages of the capacitors 15a, 15b have reached desired initial voltage values, that is, whether or not charge amounts of the capacitors 15a, 15b have exceeded threshold values (step S1104). When the control module 850 determines that the initial voltages of the capacitors 15a, 15b have not yet reached the desired initial voltage values (step S1104: No), the control module 850 continues charging using the current path shown in FIG. 13, and performs the determination in step S1104 again.

On the other hand, when the control module 850 determines that the initial voltage values of the capacitors 15a, 15b have reached the desired initial voltage values (step S1104: Yes), the control module 850 performs a control of stopping charging of the capacitors 15a, 15b (step S1105).

Charging of the capacitors 14a, 15a, 15b up to the desired initial voltage values can be realized in accordance with the above-mentioned steps.

As has been explained heretofore, according to the first and second embodiments, it is possible to realize the multi-level circuit method which can output multi-level voltages while decreasing the number of parts of the switching devices and the number of parts of the capacitors compared to the prior art. Effective cooling is easily acquired by decreasing the number of parts. Since cooling is facilitated, tolerance in margin is increased so that the power conversion apparatus can be miniaturized.

According to the first and second embodiments, a switching loss of the whole multi-level converter 1 can be further decreased.

Further, according to the first and second embodiments, when an abnormality occurs (for example, when an overvoltage is generated), it is possible to prevent a voltage of the capacitor 14a and voltages of the capacitors 15a, 15b from becoming an overvoltage.

Also, by operating the bidirectional bypass switch 120 when an abnormality is detected, a main circuit current does not flow into the capacitor of the single-phase 2-level converter 40 or the capacitors of the single-phase 3-level converter 50, and stored charge in the capacitors is gradually discharged by the discharge resistance. Accordingly, it is possible to protect the capacitors from an overvoltage or the like. In this manner, according to the first and second embodiments, a large-sized overvoltage suppression resistor for the single-phase 2-level converter becomes unnecessary and hence, volume (size) of the protection circuit system can be decreased.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus, comprising:
   a first converter including a first capacitor connected in parallel to a first resistor;
   a second converter including a second capacitor connected in series to a third capacitor, the second capacitor connected in parallel to a second resistor, the third capacitor connected in parallel to a third resistor, the second converter connected in series to the first converter;
   a bypass switch connected in parallel to the first converter and in series to the second converter; and
   a control module configured to control a single-phase output voltage by operation of the first converter, the second converter, and the bypass switch.

2. The power conversion apparatus of claim 1, wherein the first converter is a single-phase 2-level converter.

3. The power conversion apparatus of claim 1, wherein the second converter is a single-phase 3-level converter.

4. The power conversion apparatus of claim 1, further comprising:
   an overvoltage suppression circuit connected to the second capacitor and the third capacitor.

5. The power conversion apparatus of claim 4, wherein the control module is configured to determine whether any of the first capacitor, the second capacitor, and the third capacitor exceed a predetermined voltage level, and to control the bypass switch and the overvoltage suppression circuit to reduce a voltage level of any of the first capacitor, the second capacitor, and the third capacitor when the predetermined voltage level is determined to be exceeded.

6. The power conversion apparatus of claim 5, wherein the control module is configured to control the bypass switch and the overvoltage suppression circuit to prevent charging of any of the first capacitor, the second capacitor, and the third capacitor when an abnormality is detected in the power conversion apparatus or in a component to which the power conversion apparatus is connected.

7. The power conversion apparatus of claim 1, wherein the first converter includes:
   a first switching device connected in series with a second switching device;
   a third switching device connected in series to a fourth switching device;
   a first resistor connected to a first terminal of the first capacitor and a second terminal of the first capacitor;
   a first diode connected in reverse-parallel to the first switching device;
   a second diode connected in reverse-parallel to the second switching device;
   a third diode connected in reverse-parallel to the third switching device; and
   a fourth diode connected in reverse-parallel to the fourth switching device,
   wherein the first terminal of the first capacitor is connected to the first switching device and the third switching device and the second terminal of the first capacitor is connected to the second switching device and the fourth switching device.

8. The power conversion apparatus of claim 1, wherein the second converter includes:
   a fifth switching device connected in series with a sixth switching device, the fifth switching device connected to a first terminal of the second capacitor and the sixth switching device connected to a first terminal of the third capacitor;
   a seventh switching device connected in series with an eighth switching device, the seventh switching device connected to the first terminal of the second capacitor, the eighth switching device connected to the first terminal of the third capacitor; and
   a bidirectional switch including a ninth switching device connected in series with a tenth switching device, the tenth switching device connected to a first connection that is between the second capacitor and the third capacitor and the ninth switching device is connected to a second connection point that is between the seventh switching device and the eighth switching device.

9. A power conversion apparatus for converting single phase AC power to DC power, the power conversion apparatus comprising:
   a single-phase 2-level converter including:
      a first capacitor;
      a first switching device and a second switching device that are connected in series to each other to form a first series-connected element that is connected in parallel to the first capacitor, the first series-connected element having a first connection point between the first and second switching devices that can be connected to a power source that supplies single-phase alternating current; and
      a third switching device and a fourth switching device that are connected in series to each other to form a second series-connected element that is connected in parallel to the first capacitor, the second series-connected element having a second connection point between the first and second switching devices;
   a single-phase 3-level converter including:
      a second capacitor and a third capacitor connected in series to each other to form a capacitor section;
      a fifth switching device and a sixth switching device that are connected in series to each other to form a third series-connected element that is connected in parallel to the capacitor section, the third series-connected element having a third connection point between the fifth and sixth switching devices that is connected to the second connection point;
      a seventh switching device and an eighth switching device that are connected in series to each other to form a fourth series-connected element that is connected in parallel to the capacitor section, the fourth series-connected element having a fourth connection point between the seventh and eighth switching devices; and
      a bidirectional switch having a ninth switching device and a tenth switching device that are connected in series to each other with opposite polarities, the bidirectional switch connected between the fourth connection point and a ground terminal; and
   a bidirectional bypass switch including an eleventh switching device and a twelfth switching device connected in series to each other with opposite polarities, the bidirectional bypass switch connected in parallel to the single-phase 2-level converter.

10. The power conversion device of claim 9, wherein each switching device is connected in reverse parallel to a diode.

11. The power conversion apparatus of claim 10, further comprising:
   a first resistor connected in parallel to the second capacitor
   a second resistor connected in parallel to the third capacitor; and an overvoltage suppression circuit including a third resistor connected in series to a thirteenth switching device, to form a fifth series-connected element that is connected in parallel to one of the second capacitor and third capacitor.

12. The power conversion apparatus of claim 11, further comprising:
a control module configured to control such that upon determination an abnormality has occurred, the control module turns on the eleventh switching device and the twelfth switching device of the bidirectional bypass switch, turns on the thirteenth switching device, opens all switching devices in the single-phase 2-level converter, and opens all switching devices in the single-phase 3-level converter.

13. The power conversion apparatus of claim 12, wherein the control module determines that the abnormality occurs if a voltage level of the first capacitor, the second capacitor, or the third capacitor exceeds a predetermined upper-limit threshold voltage value.

14. A method of controlling a power conversion apparatus that includes a single-phase 2-level converter including a first capacitor, a single phase 3-level converter including a second and third capacitor and connected to the single-phase 2-level converter, a bidirectional bypass switch connected in parallel to the single-phase 2-level converter and in series to the single-phase 3-level converter, an overvoltage suppression circuit connected to single-phase 3-level converter, the method comprising:

determining if any one of the first capacitor, the second capacitor, and the third capacitor have a voltage level that exceeds a predetermined upper-limit value;

placing the bidirectional bypass switch in a conductive state and turning on the overvoltage suppression circuit, when any one of the first capacitor, the second capacitor, and the third capacitor is determined to have a voltage level that exceeds the predetermined upper-limit value;

determining if any one of the second capacitor and the third capacitor exceeds the predetermined upper-limit value when it has been first determined that any one of the first capacitor, the second capacitor, and the third capacitor have a voltage level that exceeds the predetermined upper-limit value; and placing the bidirectional bypass switch in a conductive state and turning off the overvoltage suppression circuit, when it is determined that neither one of the second and third capacitor have a voltage level that exceeds the predetermined upper limit value after it has been first determined that any one of the first capacitor, second capacitor, and third capacitor have a voltage level that exceeds the predetermined upper-limit value.

15. The method of claim 14, further comprising:
detecting whether an abnormality has occurred in the power conversion apparatus and any circuits to which the power conversion apparatus is connected; and
placing the bidirectional bypass switch in a conductive state and turning on the overvoltage suppression circuit when the abnormality is detected.

* * * * *